(12) United States Patent
Asahara et al.

(10) Patent No.: US 11,933,328 B2
(45) Date of Patent: Mar. 19, 2024

(54) CYLINDER DRIVE DEVICE AND FLOW CHANNEL UNIT

(71) Applicant: SMC CORPORATION, Chiyoda-ku (JP)

(72) Inventors: Hiroyuki Asahara, Tsukuba (JP); Kazutaka Someya, Kashiwa (JP)

(73) Assignee: SMC CORPORATION, Chiyoda-ku (JP)

( * ) Notice: Subject to any disclaimer, the term of this patent is extended or adjusted under 35 U.S.C. 154(b) by 387 days.

(21) Appl. No.: 17/295,756

(22) PCT Filed: Oct. 10, 2019

(86) PCT No.: PCT/JP2019/039951
§ 371 (c)(1),
(2) Date: May 20, 2021

(87) PCT Pub. No.: WO2020/105305
PCT Pub. Date: May 28, 2020

(65) Prior Publication Data
US 2022/0018341 A1    Jan. 20, 2022

(30) Foreign Application Priority Data
Nov. 21, 2018   (JP) .................................. 2018-218322

(51) Int. Cl.
*F15B 13/08*   (2006.01)
*F15B 11/16*   (2006.01)
(Continued)

(52) U.S. Cl.
CPC .......... *F15B 13/0814* (2013.01); *F15B 11/16* (2013.01); *F16K 27/003* (2013.01);
(Continued)

(58) Field of Classification Search
CPC .............. F15B 13/0814; F15B 13/0817; F15B 13/0839; F15B 13/0857; F15B 13/0875;
(Continued)

(56) References Cited

U.S. PATENT DOCUMENTS 3,654,960 A * 4/1972 Kiernan .............. F15B 13/0817
137/271
3,817,269 A * 6/1974 Raymond ........... F15B 13/0828
137/269

(Continued)

FOREIGN PATENT DOCUMENTS

| JP | 51-16191 U | 2/1976 |
|---|---|---|
| JP | 54-147379 A | 11/1979 |
| JP | 2-66702 U | 5/1990 |
| JP | 2001-311404 A | 11/2001 |
| JP | 2011-1979 A | 1/2011 |
| JP | 2018-54117 A | 4/2018 |

OTHER PUBLICATIONS

International Search Report dated Jan. 7, 2020 in PCT/JP2019/039951 filed on Oct. 10, 2019, 2 pages.

*Primary Examiner* — Dustin T Nguyen
(74) *Attorney, Agent, or Firm* — Oblon, McClelland, Maier & Neustadt, L.L.P.

(57) ABSTRACT

In a cylinder drive device, a throttle valve and a second check valve are provided between a switch valve and a first cylinder chamber of a fluid pressure cylinder. The cylinder drive device has a flow channel unit which is interposed between a manifold and the switch valve, which allows communication between the throttle valve and the second check valve and switch valve, and which communicates with a plurality of holes in the manifold to allow a fluid to flow to the switch valve.

5 Claims, 12 Drawing Sheets

(51) Int. Cl.
*F16K 27/00* (2006.01)
*F15B 11/06* (2006.01)

(52) U.S. Cl.
CPC ........... *F15B 11/06* (2013.01); *F15B 13/0817* (2013.01); *F15B 13/0828* (2013.01); *F15B 2211/40584* (2013.01)

(58) Field of Classification Search
CPC .............. F15B 13/0871; F15B 13/0878; F15B 13/0885; F15B 13/0889; F15B 13/0892; F15B 13/0882; F15B 13/0842; F15B 13/0835; F15B 13/0832; F15B 11/16; F15B 2211/40584
See application file for complete search history.

(56) References Cited

U.S. PATENT DOCUMENTS

| | | | | |
|---|---|---|---|---|
| 5,588,465 | A * | 12/1996 | Witowski | F15B 13/0814 137/884 |
| 6,216,740 | B1 * | 4/2001 | Hayashi | F15B 13/0875 137/884 |
| 6,913,037 | B2 * | 7/2005 | Miyazoe | F15B 13/0817 137/557 |
| 7,591,280 | B2 * | 9/2009 | Narita | F15B 13/0857 137/271 |
| 2001/0003289 | A1 * | 6/2001 | Mead | F15B 13/0867 137/884 |
| 2019/0277310 | A1 | 9/2019 | Takakuwa et al. | |

\* cited by examiner

CYLINDER DRIVE DEVICE AND FLOW CHANNEL UNIT

TECHNICAL FIELD

The present invention relates to a cylinder drive device that alternately supplies fluid to a first cylinder chamber and a second cylinder chamber of each of a plurality of fluid pressure cylinders using a plurality of switching valves mounted to a manifold, and a flow path unit (flow channel unit) used for the cylinder drive device.

BACKGROUND ART

Conventionally, for one fluid pressure cylinder, a cylinder drive device that drives the fluid pressure cylinder by alternately supplying a fluid such as air to the first cylinder chamber and the second cylinder chamber separated by the piston is disclosed, for example, in Japanese Laid-Open Patent Publication No. 2001-311404.

SUMMARY OF INVENTION

Incidentally, when driving a plurality of fluid pressure cylinders, it is desirable to mount a plurality of switching valves on a manifold having a plurality of holes through which fluid flows. In this case, the fluid is supplied from the fluid supply source to the plurality of switching valves via a single supply hole. Each of the plurality of switching valves changes to the first position or the second position to alternately supply the fluid to the first cylinder chamber and the second cylinder chamber of each of the plurality of fluid pressure cylinders through the plurality of holes. In addition, as the fluid is supplied to one of the first cylinder chamber and the second cylinder chamber, fluid is discharged from the other cylinder chamber. The discharged fluid is further discharged to the outside through the plurality of holes, the plurality of switching valves and the discharging hole.

Further, by supplying a part of the fluid discharged from the other cylinder chamber to the one cylinder chamber, it becomes possible to reduce the consumption amount of the fluid. Specifically, a check valve that allows fluid to flow in the direction from the first cylinder chamber to the second cylinder chamber is provided between the first cylinder chamber and the second cylinder chamber. Further, a throttle valve is provided between the first cylinder chamber and the discharge hole. In this case, if check valves whose number is the same as that of the plurality of fluid pressure cylinders and that of the plurality of switching valves, and throttle valves whose number is the same as that of the plurality of fluid pressure cylinders and that of the plurality of switching valves, are built in the manifold, it is possible to reduce the fluid consumption while controlling the driving of the plurality of fluid pressure cylinders.

In the cylinder drive device configured as described above, the check valves and throttle valves are connected to all the fluid pressure cylinders, and all the check valves and throttle valves are built in the manifold. Therefore, when a user installs the cylinder drive device in existing equipment that drives a plurality of fluid pressure cylinders, it is necessary to replace the entire existing equipment with the new cylinder drive device. Therefore, it is not possible to adopt a configuration in which the check valve and the throttle valve are connected to only some of the fluid pressure cylinders. As a result, it is difficult to construct a cylinder drive device that is suitable for the user's application.

The present invention has been made in consideration of such a problem, and it is an object of the present invention to provide a cylinder drive device in which only one or some of fluid pressure cylinders can be connected with the check valve and the throttle valve when driving the plurality of fluid pressure cylinders. Also, it is another object of the present invention to provide a flow channel unit that is used for realizing the above-mentioned configuration of a cylinder drive device.

An aspect of the present invention relates to a cylinder drive device including a manifold having a block shape and in which a plurality of holes are formed, fluid flowing through the holes and being used to drive a plurality of fluid pressure cylinders, and a plurality of switching valves configured to be mounted to the manifold, each of the switching valves configured to alternately supply fluid to a first cylinder chamber and a second cylinder chamber of each of the plurality of fluid pressure cylinders, the first cylinder chamber and the second cylinder chamber being separated by a piston of each of the fluid pressure cylinders, and a flow path unit used for the cylinder drive device.

In this case, a check valve is provided between at least one of the plurality of fluid pressure cylinders and one of the switching valves that supplies fluid to the one of the fluid pressure cylinders, the check valve prevents fluid from flowing in a direction from the one switching valve to a first cylinder chamber of the one fluid pressure cylinder. Further, a throttle valve is provided between the first cylinder chamber of the one fluid pressure cylinder and the one switching valve.

The cylinder drive device includes a flow path unit. The flow path unit is interposed between the manifold and the one switching valve, the flow path unit allowing communication between the one switching valve and the check valve and between the one switching valve and the throttle valve, the flow path unit communicating with the plurality of holes in a manner that fluid flows into the one switching valve.

According to the present invention, the flow path unit is interposed between the manifold and the at least one switching valve. Thus, when driving the plurality of fluid pressure cylinders, the check valve and the throttle valve can be connected to only some of the fluid pressure cylinders. That is, the cylinder drive device can be configured by mounting a required number of flow path units to the manifold of the existing equipment currently in operation. Therefore, the cylinder drive device can be easily constructed according to the user's application.

DESCRIPTION OF EMBODIMENTS

Preferred embodiments of a cylinder drive device and a flow path unit according to the present invention will be described in detail below with reference to the accompanying drawings.

[1. Configuration of Present Embodiment]

Figure 1:
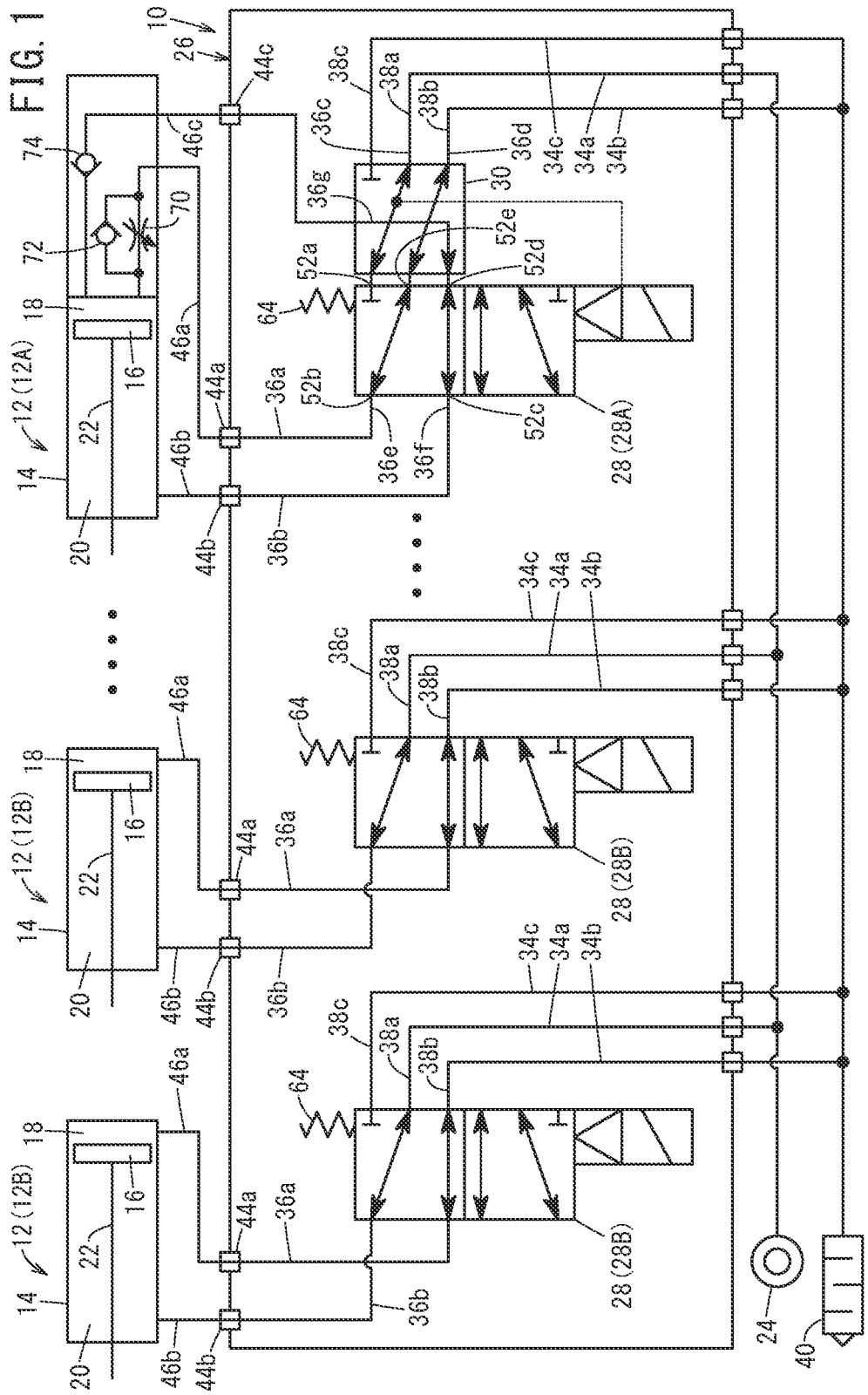
FIG. 1 is a schematic configuration diagram of a cylinder drive device according to a present embodiment.

As shown in FIG. 1, a cylinder drive device 10 according to the present embodiment drives a plurality of fluid pressure cylinders 12. Each of the fluid pressure cylinders 12 is, for example, an air cylinder, and has a cylinder portion 14 and a piston 16. The piston 16 separates the inside of the cylinder portion 14 into a first cylinder chamber 18 and a second cylinder chamber 20, and is slidable reciprocally inside the cylinder portion 14 by the action of fluid pressure. A piston rod 22 is connected to the piston 16. The piston rod 22 has one end connected to the piston 16 and the other end extending from the cylinder portion 14 to the outside.

The fluid pressure cylinder 12 performs work such as positioning of a workpiece (not shown) when the piston rod 22 is pushed out (extended). Further, the fluid pressure cylinder 12 does not perform specific work when the piston rod 22 is retracted. The first cylinder chamber 18 is a drive pressure chamber (head-side cylinder chamber) located on the opposite side of the piston rod 22. The second cylinder chamber 20 is a return-side pressure chamber (rod-side cylinder chamber) located on the piston rod 22 side.

As shown in FIGS. 1 to 11, the cylinder drive device 10 includes a fluid supply source 24, a manifold 26, a plurality of switching valves 28, and a flow path unit 30.

The fluid supply source 24 supplies high pressure fluid to the manifold 26, and is, for example, an air compressor.

The manifold 26 is made of, for example, a metal material such as aluminum and has a block shape. The manifold 26 is not limited to a metal material, and any material such as hard resin may be used.

That is, the manifold 26 has a rectangular parallelepiped shape and has first to sixth outer surfaces 32a to 32f. The first outer surface 32a is the bottom surface of the manifold 26, and is an installation surface (attaching surface) for installing the manifold 26 on a fixed base (not shown). The second outer surface 32b is an upper surface located apart from the first outer surface 32a in the height direction of the manifold 26 (direction of arrow A), and the switching valves 28 are mounted thereto, the number of the switching valves 28 being the same as that of the plurality of fluid pressure cylinders 12. The third outer surface 32c and the fourth outer surface 32d are side surfaces spaced apart from each other in the longitudinal direction (direction of arrow B) of the manifold 26. The fifth outer surface 32e and the sixth outer surface 32f are side surfaces that are spaced apart from each other in the lateral direction (direction of arrow C) of the manifold 26.

In the manifold 26, a plurality of holes are formed, and fluid flows through the holes and is used to drive the plurality of fluid pressure cylinders 12. That is, the plurality of holes of the manifold 26 are one supply port 34a, two discharge ports 34b and 34c, a plurality of first connection ports 36a, and a plurality of second connection ports 36b. The number of the first connection ports 36a and the number of the second connection ports 36b are the same as the number of the fluid pressure cylinders 12 and the number of the switching valves 28. It is adequate that at least one of the discharge port 34b or the discharge port 34c may be provided in the manifold 26.

Each of the supply port 34a and the two discharge ports 34b and 34c is a through hole (passage) that extends substantially linearly in the direction of arrow B and opens on the third outer surface 32c and the fourth outer surface 32d.

Figure 2:
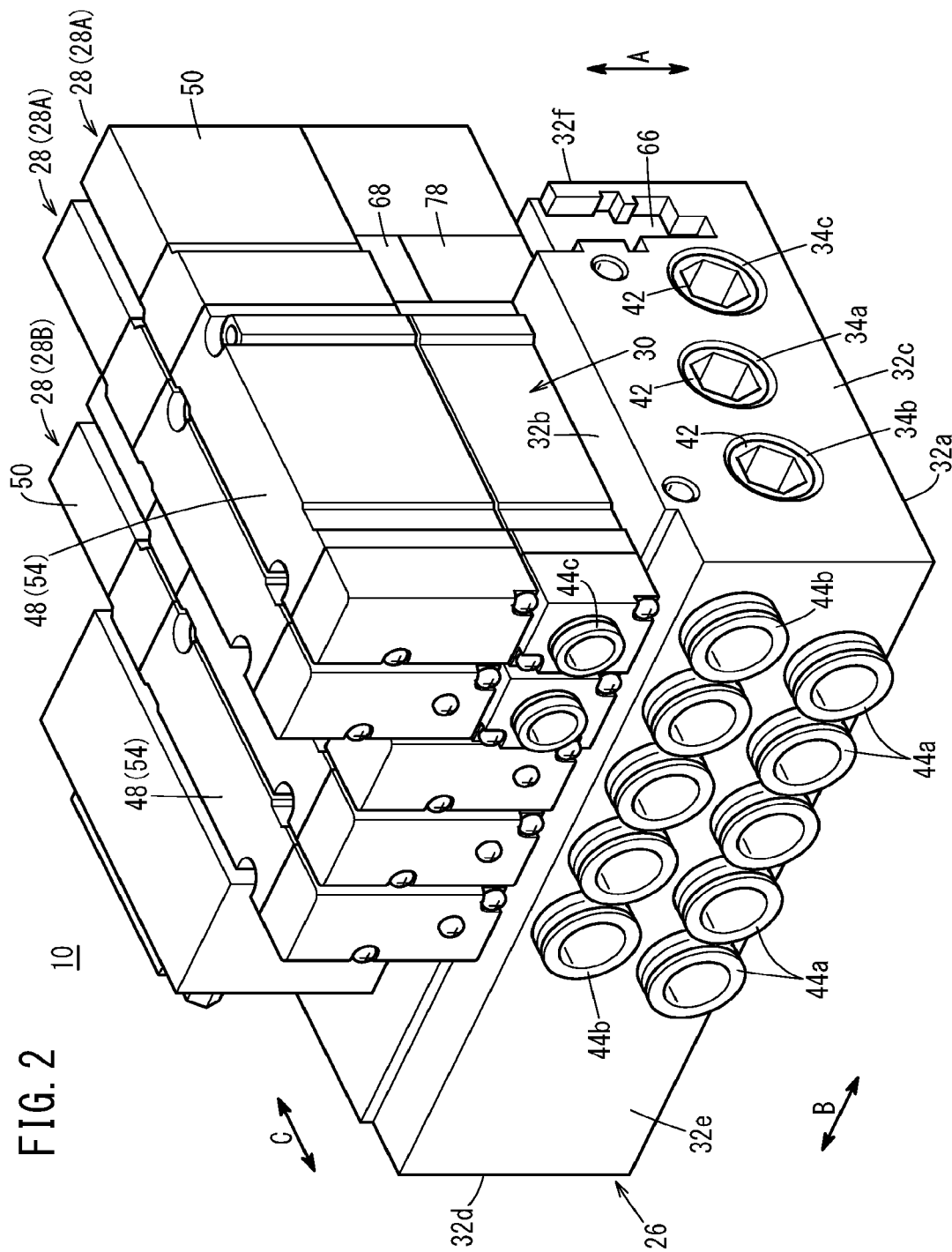
FIG. 2 is a perspective view of the cylinder drive device of FIG. 1.
Figure 3:
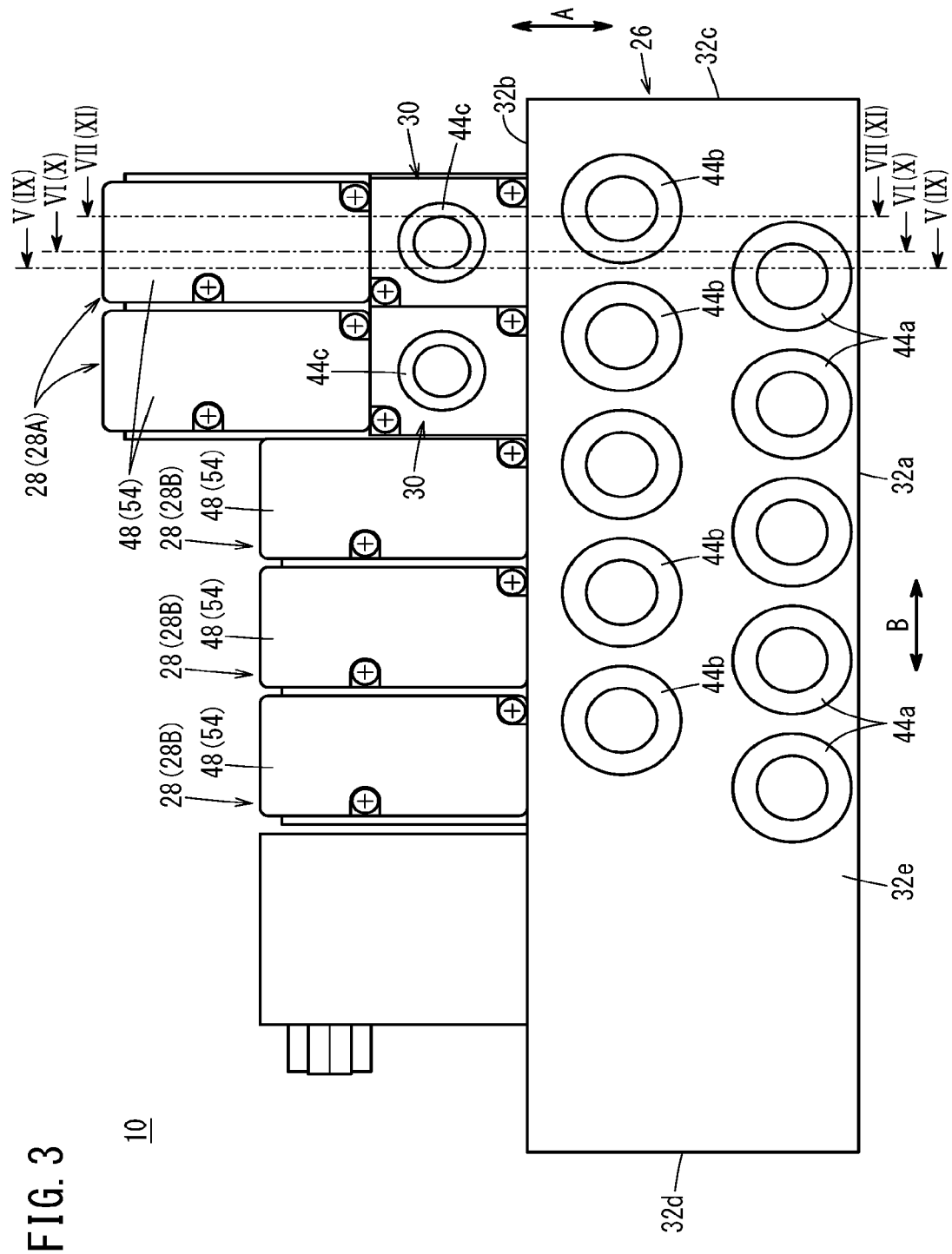
FIG. 3 is a front view of the cylinder drive device of FIG. 2.
Figure 4:
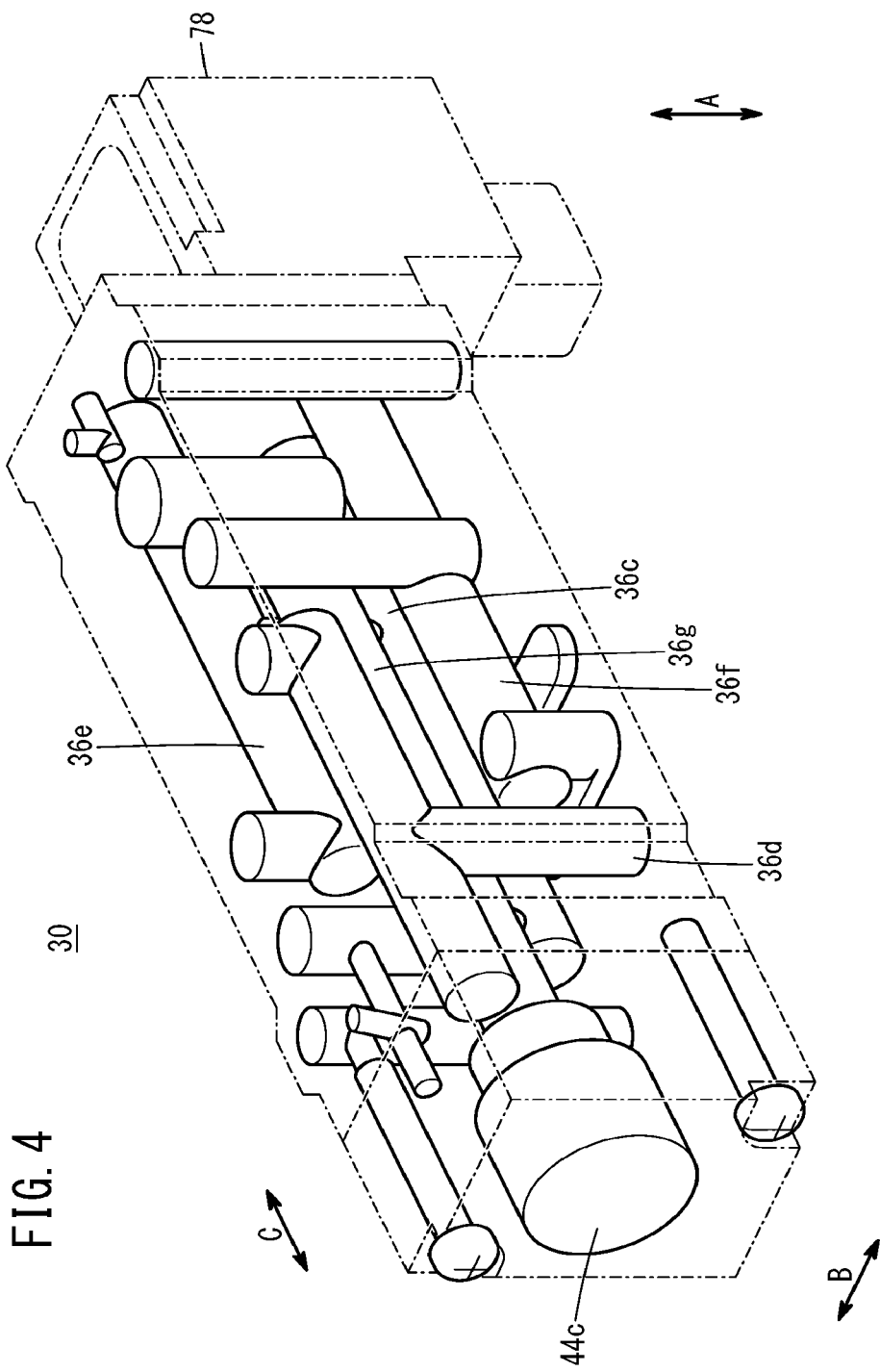
FIG. 4 is a perspective view illustrating a part of configuration inside a flow path unit.

Fluid is supplied from the fluid supply source 24 to the supply port 34a. As shown in FIGS. 2 and 3, a plurality of switching valves 28 are arranged on the second outer surface 32b at predetermined intervals in the direction of arrow B. Therefore, in the manifold 26, a plurality of supply holes 38a (see FIGS. 5, 6, 9, and 10) for communicating with the plurality of switching valves 28 extend from positions in the supply port 34a directly below the plurality of switching valves 28 to the second outer surface 32b, in the direction of arrow A.

The two discharge ports 34b and 34c discharge the fluid from the manifold 26 to the outside. In the manifold 26, a plurality of discharge holes 38b, 38c (see FIGS. 5 to 7 and 9 to 11) for communicating with the plurality of switching valves 28 extend from positions in the two discharge ports 34b and 34c directly below the plurality of switching valves 28 to the second outer surface 32b, in the direction of arrow A. Further, a silencer 40 (see FIGS. 1 and 8) is connected to the two discharge ports 34b and 34c for reducing the discharge sound of the fluid in order to more smoothly discharge the fluid from the manifold 26 to the outside.

A blocking member 42 for blocking the passage of fluid is provided at each end of the supply port 34a and the two discharge ports 34b, 34c on the third outer surface 32c or the fourth outer surface 32d (see FIG. 2). That is, the blocking member 42 is provided at the end of the supply port 34a to which the fluid supply source 24 is not connected, and at the ends of the two discharge ports 34b and 34c to which the silencer 40 is not connected.

Each of the plurality of first connection ports 36a is a hole (passage) for allowing communication between the first cylinder chamber 18 of the corresponding fluid pressure cylinder 12 and the switching valve 28. That is, each of the plurality of first connection ports 36a is formed in a substantially L shape in the manifold 26 below the corresponding switching valve 28 in the cross-sectional views of FIGS. 5 and 9. Each of the first connection ports 36a is a hole that opens on the second outer surface 32b and the fifth outer surface 32e. Specifically, each of the plurality of first connection ports 36a extends in the manifold 26 in the direction of arrow C from the portion of the fifth outer surface 32e on the first outer surface 32a side toward the sixth outer surface 32f, and bends in the direction of arrow A. Then, each of the plurality of first connection ports 36a extends in the direction of arrow A toward the second outer surface 32b, between the supply port 34a and the discharge port 34c.

First connectors 44a are provided at the openings on the fifth outer surface 32e at the plurality of first connection ports 36a. Each of the first connectors 44a can be connected to a first connection tube 46a that allows communication between the first cylinder chamber 18 and the first connection port 36a.

Each of the plurality of second connection ports 36b is a hole (passage) for allowing communication between the second cylinder chamber 20 of the corresponding fluid pressure cylinder 12 and the switching valve 28. That is, each of the plurality of second connection ports 36b is formed in a substantially L-shape in the manifold 26 below the corresponding switching valve 28 in the cross-sectional views of FIGS. 7 and 11. Each of the plurality of second connection ports 36b is a hole that opens on the second outer surface 32b and the fifth outer surface 32e. Specifically, each of the plurality of second connection ports 36b in the manifold 26 extends in the direction of arrow C from the portion of the fifth outer surface 32e on the second outer surface 32b side toward the sixth outer surface 32f, and bends in the direction of arrow A. Then, each of the plurality of second connection ports 36b extends in the direction of arrow A toward the second outer surface 32b.

Second connectors 44b are provided at the openings on the fifth outer surface 32e at the plurality of second connection ports 36b. Each of the second connectors 44b can be connected to a second connection tube 46b that allows communication between the second cylinder chamber 20 and the second connection port 36b. As shown in FIGS. 2 and 3, on the fifth outer surface 32e of the manifold 26, the first connectors 44a and the second connectors 44b are arranged alternately in the direction of arrow B.

Each of the plurality of switching valves 28 supplies fluid alternately to the first cylinder chamber 18 and the second cylinder chamber 20 of the corresponding fluid pressure cylinder 12. The plurality of switching valves 28 are so-called 5-port pilot type solenoid valves, and each include a valve body 48 and a pilot valve mechanism 50 provided for the valve body 48. The valve body 48 includes a body 54 in which first to fifth ports 52a to 52e are formed, and a spool 58 disposed displaceably in the direction of arrow C in a valve chamber 56 of the body 54. In the external view of FIGS. 2 and 3, the body 54 is a rectangular parallelepiped block extending in the direction of arrow C. In the external view of FIGS. 2 and 3, the pilot valve mechanism 50 is a rectangular parallelepiped block that extends in the direction of arrow A and is provided continuously on the sixth outer surface 32f side of the body 54.

As shown in FIGS. 5 to 7 and FIGS. 9 to 11, in the body 54, in the direction of arrow C, the first port 52a, the second port 52b, the fifth port 52e, the third port 52c, and the fourth port 52d are located in this order. The spool 58 extends in the direction of arrow C, and has a plurality of land portions 62 radially bulging in the valve chamber 56 and provided with seal rings 60. By bringing any of the land portions 62 into contact with the wall surface of the valve chamber 56, communication between two adjacent ports (for example, between the first port 52a and the second port 52b) can be blocked. That is, by displacing the spool 58, the switching valve 28 can switch the state between the two adjacent ports into a communication state or a blocking state.

Further, the switching valve 28 is a solenoid valve and is held in a second position shown in FIGS. 1 and 5 to 7 by the biasing force of a spring 64 when not energized. Furthermore, the switching valve 28 is switched from the second position to a first position shown in FIGS. 8 to 11 by the action of the pilot valve mechanism 50 when energized. Then, the switching valve 28 is energized through the output of an energization command to the switching valve 28 from a Programmable Logic Controller (PLC), which is a higher-level device (not shown).

Specifically, on the sixth outer surface 32f side of the manifold 26, an energizing portion 66 for outputting an energization command from the PLC to the plurality of switching valves 28 is provided in the direction of arrow B. The pilot valve mechanism 50 of the switching valve 28 is provided with a connector 68 that is connected to the energizing portion 66 to receive the energization command from the energizing portion 66.

Figure 8:
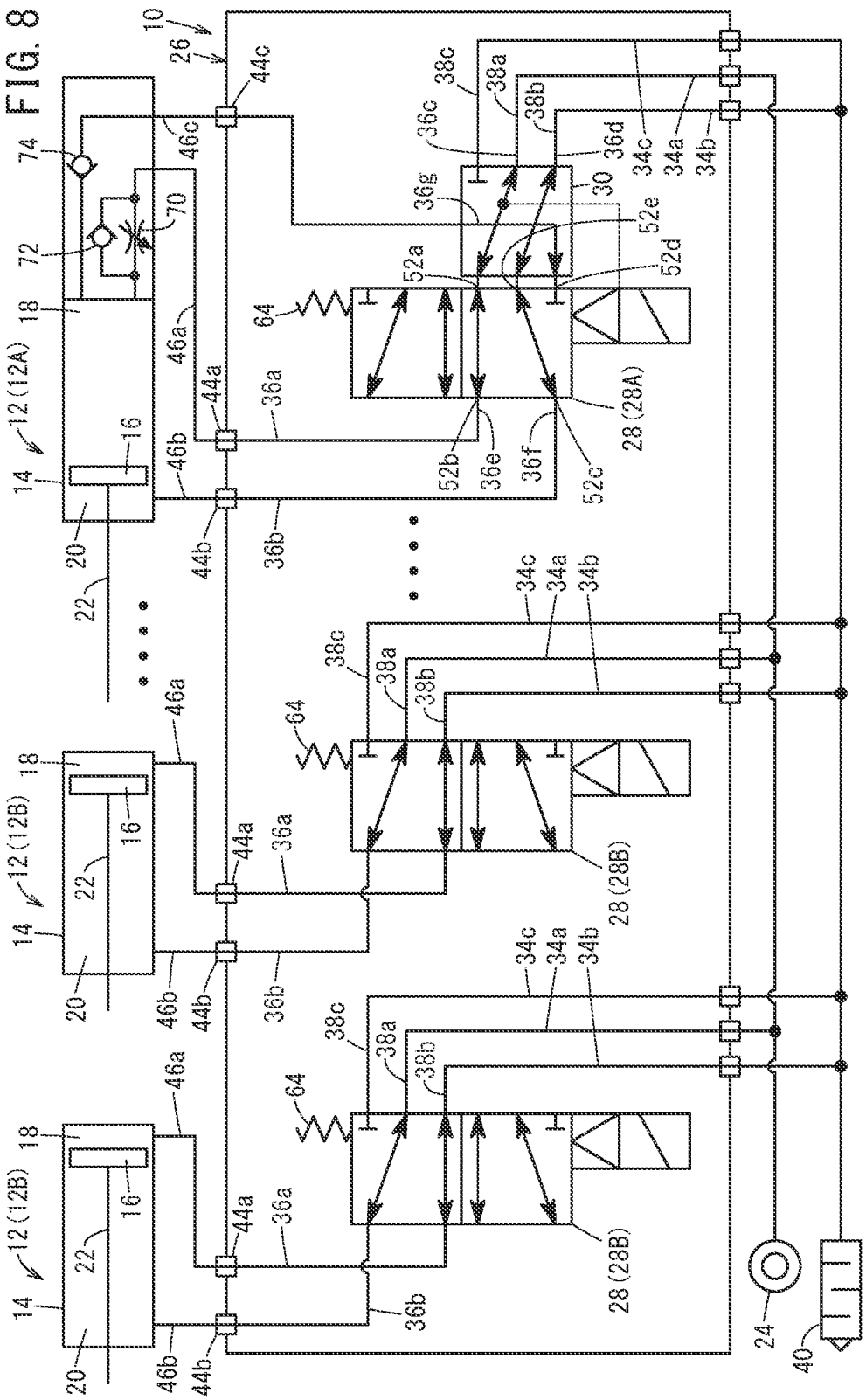
FIG. 8 is a schematic configuration diagram of the cylinder drive device of FIG. 1, illustrating a first position of a switching valve.
Figure 9:
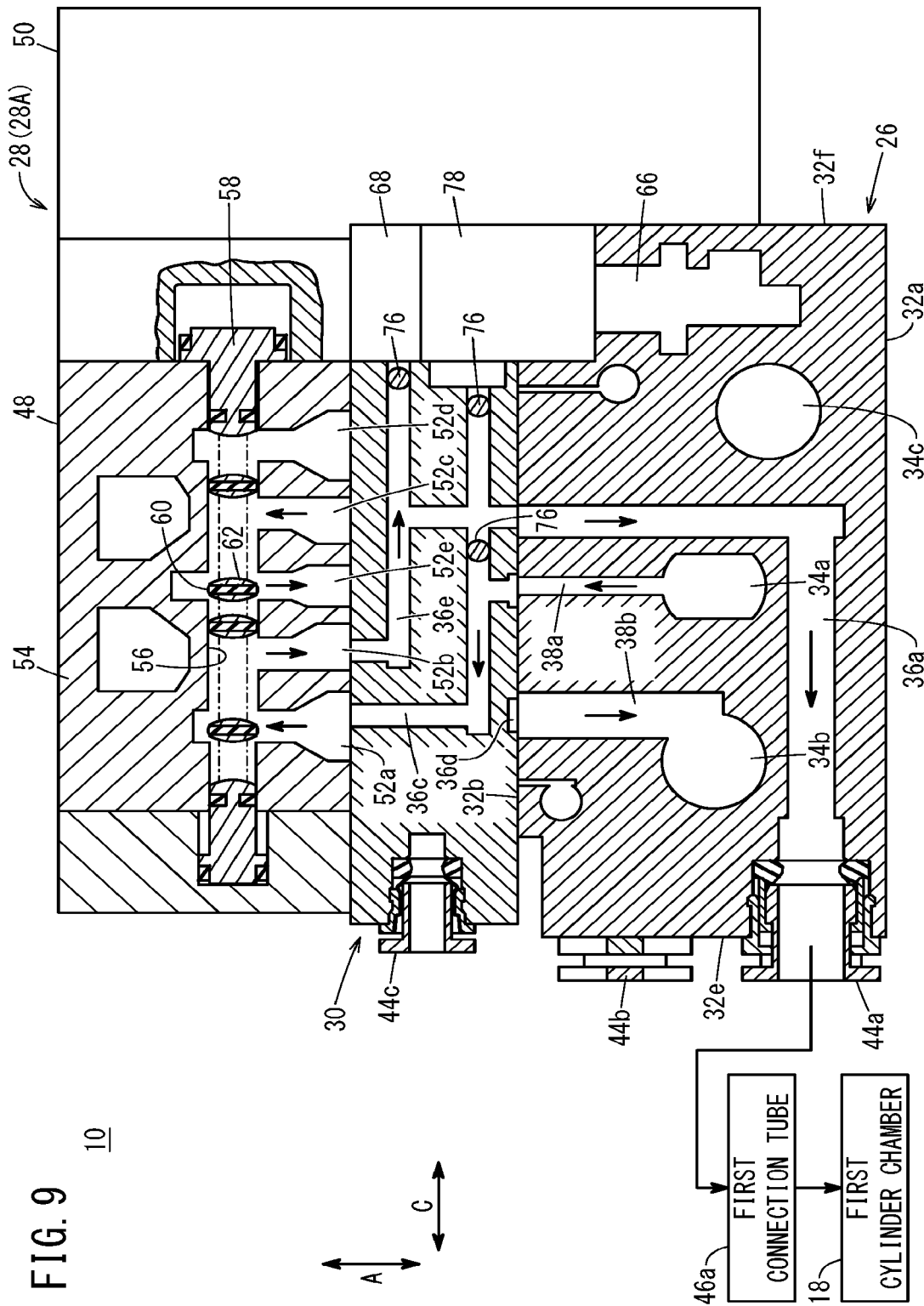
FIG. 9 is a sectional view taken along line IX-IX of FIG. 3.

Then, in the cylinder drive device 10 according to the present embodiment, at least one switching valve 28 among the plurality of switching valves 28 is mounted on the second outer surface 32b of the manifold 26 via the flow path unit 30. FIGS. 1 and 8 illustrate the case where one switching valve 28 is mounted to the manifold 26 via the flow path unit 30. FIGS. 2 and 3 illustrate the case where two switching valves 28 are mounted on the second outer surface 32b of the manifold 26 via the flow path units 30.

In the following description, the switching valves 28 mounted on the second outer surface 32b of the manifold 26 via the flow path units 30 are each referred to as a switching valve 28A, and the fluid pressure cylinders 12 driven by the switching valves 28A are each referred to as a fluid pressure cylinder 12A. The switching valves 28 directly mounted on the second outer surface 32b of the manifold 26 are each referred to as a switching valve 28B, and the fluid pressure cylinders 12 driven by the switching valves 28B are each referred to as a fluid pressure cylinder 12B.

The flow path unit 30 is a substantially rectangular parallelepiped block body that can be interposed between the body 54 of the switching valve 28A and the second outer surface 32b of the manifold 26. In the flow path unit 30, a plurality of holes are formed and the fluid used to drive the corresponding fluid pressure cylinder 12A flows therethrough. That is, the plurality of holes of the flow path unit 30 are the third to seventh connection ports 36c to 36g (see FIGS. 4 to 7 and 9 to 11). In this case, the switching valve 28A to which the flow path unit 30 is interposed can communicate with the first cylinder chamber 18 through a throttle valve 70 and a first check valve 72 (see FIGS. 1 and 8) provided in the first connection tube 46a. Further, the flow path unit 30 can communicate with the first cylinder chamber 18 via a third connection tube 46c provided with a second check valve 74 (check valve).

The throttle valve 70, the first check valve 72, and the second check valve 74 are arranged on the first cylinder chamber 18 side. The throttle valve 70 and the first check valve 72 are connected in parallel in the middle of the first connection tube 46a. The first check valve 72 allows the flow of fluid in the direction (supply direction) from the switching valve 28A toward the first cylinder chamber 18 of the fluid pressure cylinder 12A in the first connection tube 46a, while the first check valve 72 blocks the flow of fluid in the direction (discharging direction) from the first cylinder chamber 18 toward the switching valve 28A. The throttle valve 70 is a variable throttle valve, and allows the fluid discharged from the first cylinder chamber 18 to pass through. The second check valve 74 allows the flow of fluid in the direction (discharging direction) from the first cylinder chamber 18 toward the switching valve 28A in the third connection tube 46c, while the second check valve 74 also blocks the flow of fluid from the switching valve 28A toward the first cylinder chamber 18.

The third connection port 36c is a hole (passage) for allowing communication between the supply hole 38a connected to the supply port 34a and the first port 52a of the switching valve 28. That is, in the cross-sectional views of FIGS. 5 and 9, the third connection port 36c slightly extends in the flow path unit 30 in the direction of arrow A from the opening of the supply hole 38a on the second outer surface 32b toward the switching valve 28A, and bends in the direction of arrow C to extend toward the fifth outer surface 32e side. Then, the third connection port 36c further bends in the direction of arrow A to extend toward the first port 52a.

The fourth connection port 36d is a hole (passage) for allowing communication between the discharge hole 38b connected to the discharge port 34b on the fifth outer surface 32e side and the fifth port 52e of the switching valve 28A. That is, in the cross-sectional views of FIGS. 5 to 7 and 9 to 11, the fourth connection port 36d extends in the flow path unit 30 in the direction of arrow A from the opening of the discharge hole 38b on the second outer surface 32b toward the switching valve 28A, and bends in the direction of arrow C to extend toward the sixth outer surface 32f side. Then, the fourth connection port 36d further bends in the direction of arrow A to extend toward the fifth port 52e.

The fifth connection port 36e is a hole (passage) for allowing communication between the first connection port 36a, which communicates with the first cylinder chamber 18 via the throttle valve 70 and the first check valve 72, and the second port 52b of the switching valve 28A. That is, in the cross-sectional views of FIGS. 5 and 9, the fifth connection port 36e extends in the flow path unit 30 in the direction of arrow A from the opening of the first connection port 36a on the second outer surface 32b toward the switching valve 28A, and bends in the direction of arrow C to extend toward the fifth outer surface 32e side. Then, the fifth connection port 36e further bends in the direction of arrow A to extend toward the second port 52b.

The sixth connection port 36f is a hole (passage) for allowing communication between the second connection port 36b communicating with the second cylinder chamber 20 and the third port 52c of the switching valve 28A. That is, in the cross-sectional views of FIGS. 7 and 11, the sixth connection port 36f slightly extends in the flow path unit 30 in the direction of arrow A from the opening of the second connection port 36b on the second outer surface 32b toward the switching valve 28A, and bends in the direction of arrow C to extend toward the sixth outer surface 32f side. Then, the sixth connection port 36f further bends in the direction of arrow A to extend toward the third port 52c.

The seventh connection port 36g is a hole (passage) for allowing communication between the third connection tube 46c provided with the second check valve 74 and the fourth port 52d of the switching valve 28A. That is, the seventh connection port 36g is a hole in a substantially L shape in the flow path unit 30 in the cross-sectional views of FIGS. 6 and 10. The seventh connection port 36g extends in the direction of arrow C from the fifth outer surface 32e side of the flow path unit 30, and bends in the direction of arrow A to extend toward the fourth port 52d. A third connector 44c is provided at the opening of the seventh connection port 36g on the fifth outer surface 32e side. The third connector 44c can be connected to the third connection tube 46c.

In FIGS. 5 to 7 and 9 to 11, some of the third to seventh connection ports 36c to 36g branch and extend in the direction of arrow C to communicate with the outside or another connection port. Blocking members 76 are arranged at such communicating portions, for blocking the outflow of the fluid to the outside or the inflow of the fluid to the other connection port.

Further, on the sixth outer surface 32f side of the flow path unit 30, a connecting portion 78 is provided as an adapter that connects the connector 68 of the switching valve 28A and the energizing portion 66 when the switching valve 28A is mounted to the manifold 26 via the flow path unit 30.

[2. Operation According to the Present Embodiment]

The operation of the cylinder drive device 10 and the flow path unit 30 configured as above according to the present embodiment will be described with reference to FIGS. 1 to 11. Here, a description will be given concerning a case where fluid is supplied to the first cylinder chamber 18 or the second cylinder chamber 20 of the fluid pressure cylinder 12A, by switching the switching valve 28A mounted via the flow path unit 30 on the second outer surface 32b of the manifold 26 to the first position or the second position.

As shown in FIGS. 1 to 3 and 8, concerning the switching valve 28B directly mounted on the second outer surface 32b of the manifold 26, for example, two switching valves 28B shown on the left side on FIGS. 1 and 8, the operation for switching such switching valves 28B to the first position or the second position is well known. Therefore, concerning the fluid pressure cylinder 12B that is operated by the switching valve 28B which is directly mounted to the second outer surface 32b, the description of the operation of the fluid pressure cylinder 12B will be omitted.

First, in the initial state, as shown in FIG. 1, the piston 16 of the fluid pressure cylinder 12A is located at the stroke end opposite to the piston rod 22. In this case, the switching valve 28A mounted on the second outer surface 32b of the manifold 26 via the flow path unit 30 is located at the second position.

Then, when the driving process of extending the piston rod 22 is performed in the cylinder drive device 10, the switching valve 28A is switched from the second position to the first position as shown in FIG. 8. As a result, in FIGS. 8 and 9, high-pressure fluid (compressed air) supplied from the fluid supply source 24 to the supply port 34a of the manifold 26 branches into the supply hole 38a. The fluid branched to the supply hole 38a flows into the first cylinder chamber 18 of the fluid pressure cylinder 12A to be driven, via the third connection port 36c of the flow path unit 30, the first port 52a and the second port 52b of the switching valve 28A, the fifth connection port 36e of the flow path unit 30, the first connection port 36a and the first connector 44a of the manifold 26, and the first connection tube 46a (first check valve 72). As a result, the piston 16 is displaced toward the piston rod 22 side, and the piston rod 22 extends.

In this case, the switching valve 28A blocks the communication between the third port 52c and the fourth port 52d. Therefore, the supply of the fluid is blocked between the second connection tube 46b and the third connection tube 46c, while the second connection tube 46b is connected to the third port 52c via the second connection port 36b and the sixth connection port 36f and the third connection tube 46c is connected to the fourth port 52d via the seventh connection port 36g. As a result, the fluid from the fluid supply source 24 is supplied to the first cylinder chamber 18 efficiently.

Figure 10:
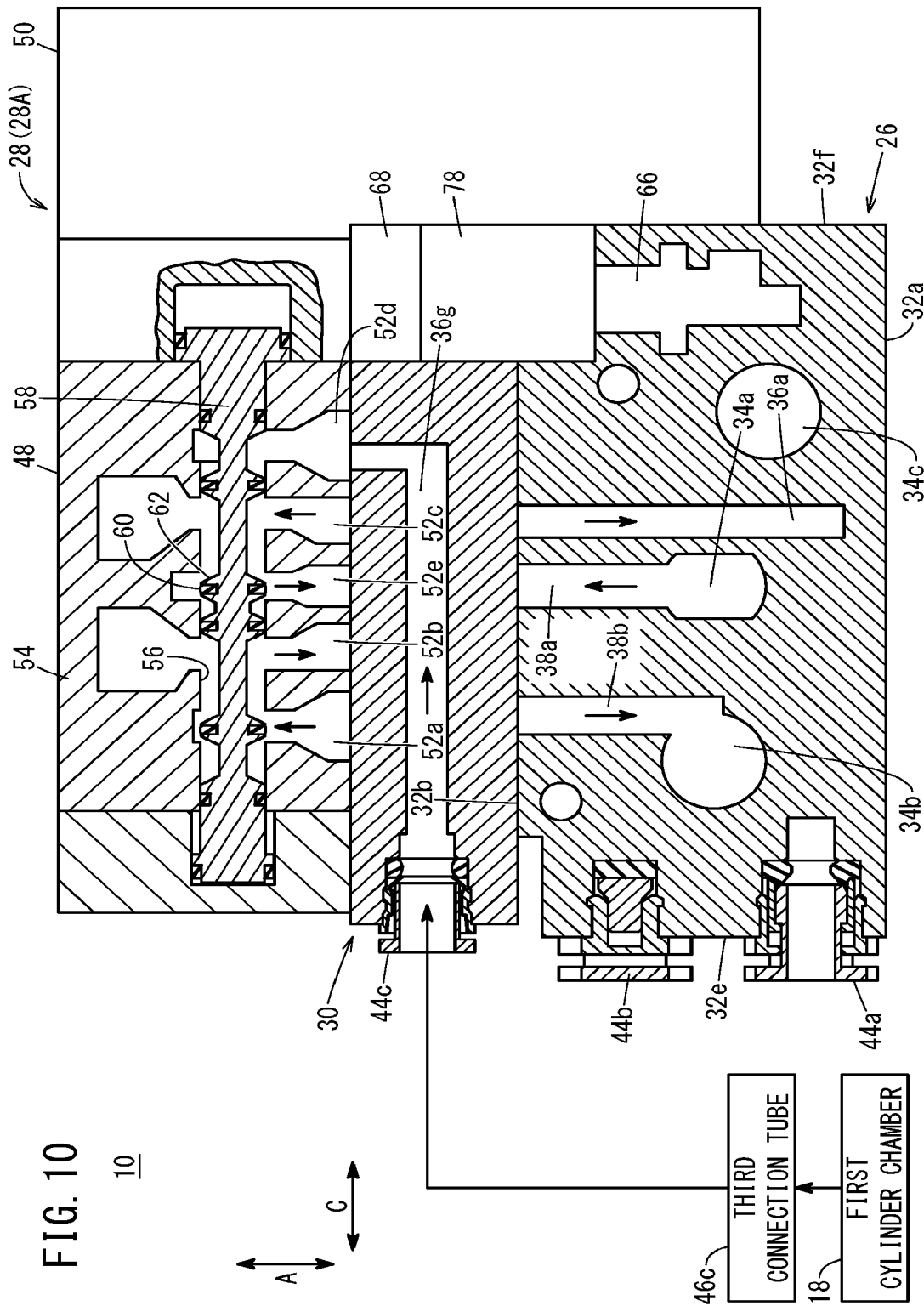
FIG. 10 is a sectional view taken along line X-X of FIG. 3.
Figure 11:
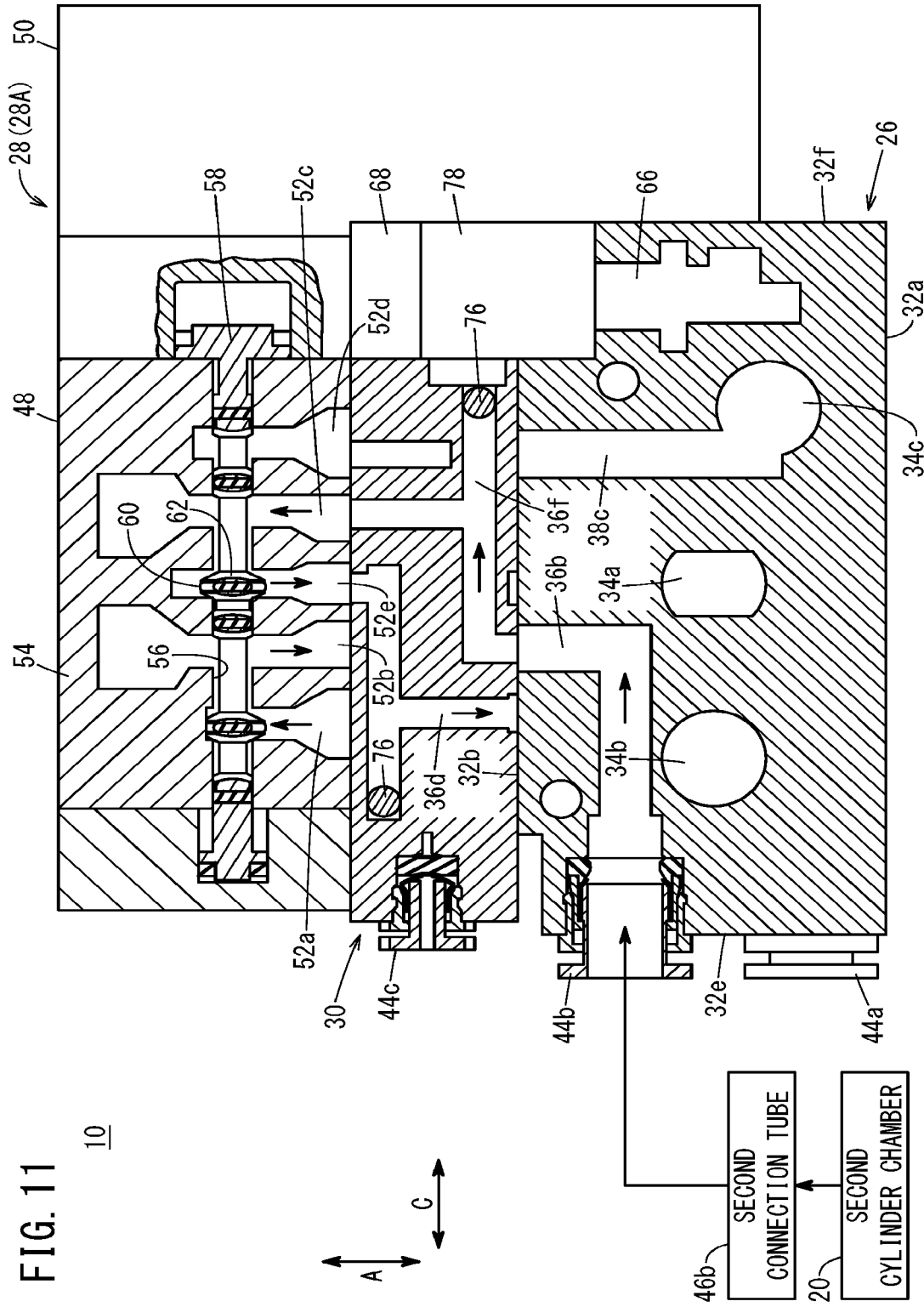
FIG. 11 is a sectional view taken along line XI-XI of FIG. 3.

Further, as shown in FIGS. 8, 10 and 11, the fluid in the second cylinder chamber 20 of the fluid pressure cylinder 12A is discharged to the outside, via the second connection tube 46b, the second connection port 36b, the sixth connection port 36f, the third port 52c, the fifth port 52e, the fourth connection port 36d, the discharge hole 38b, the discharge port 34b, and the silencer 40.

Figure 5:
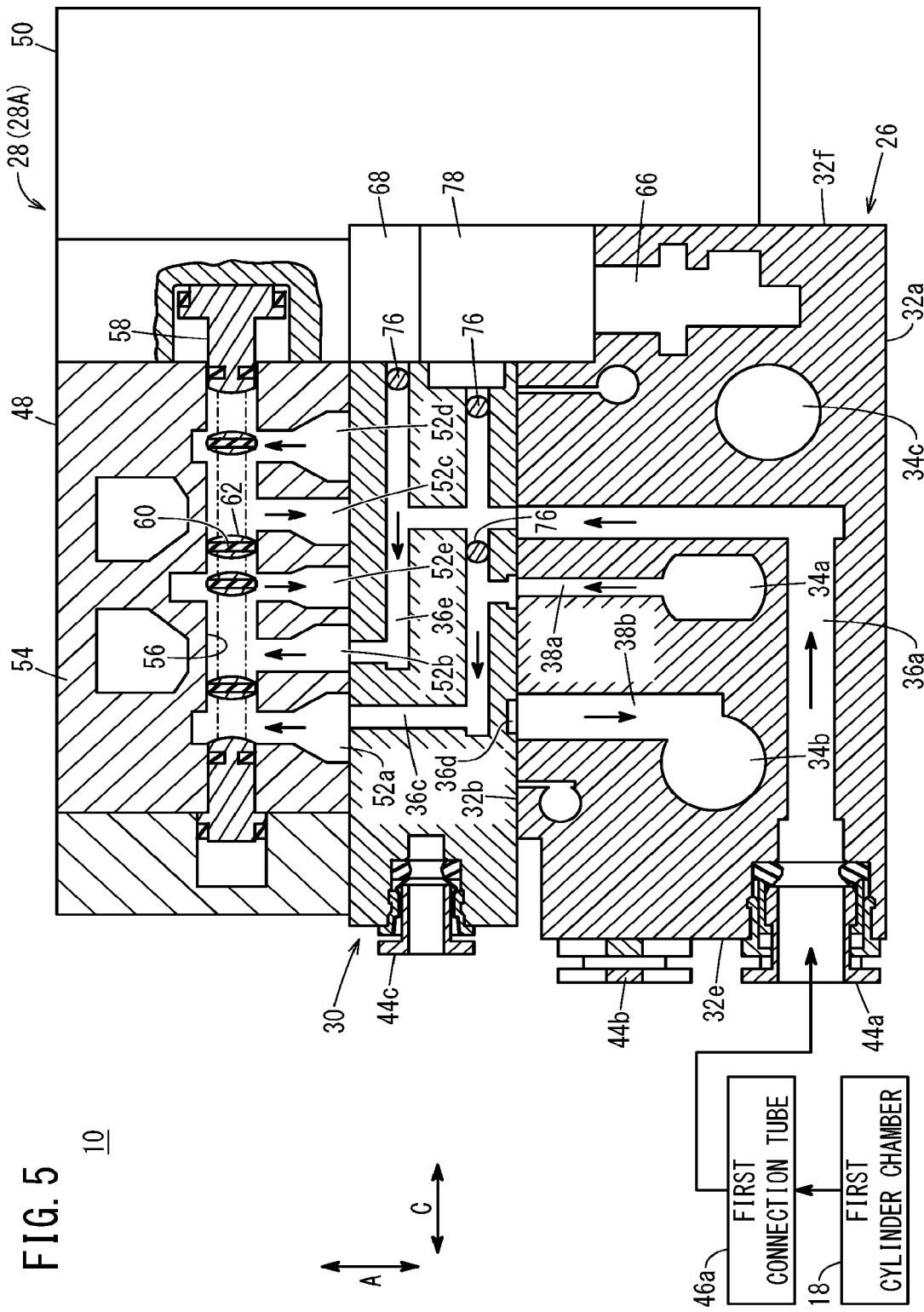
FIG. 5 is a sectional view taken along line V-V of FIG. 3.
Figure 6:
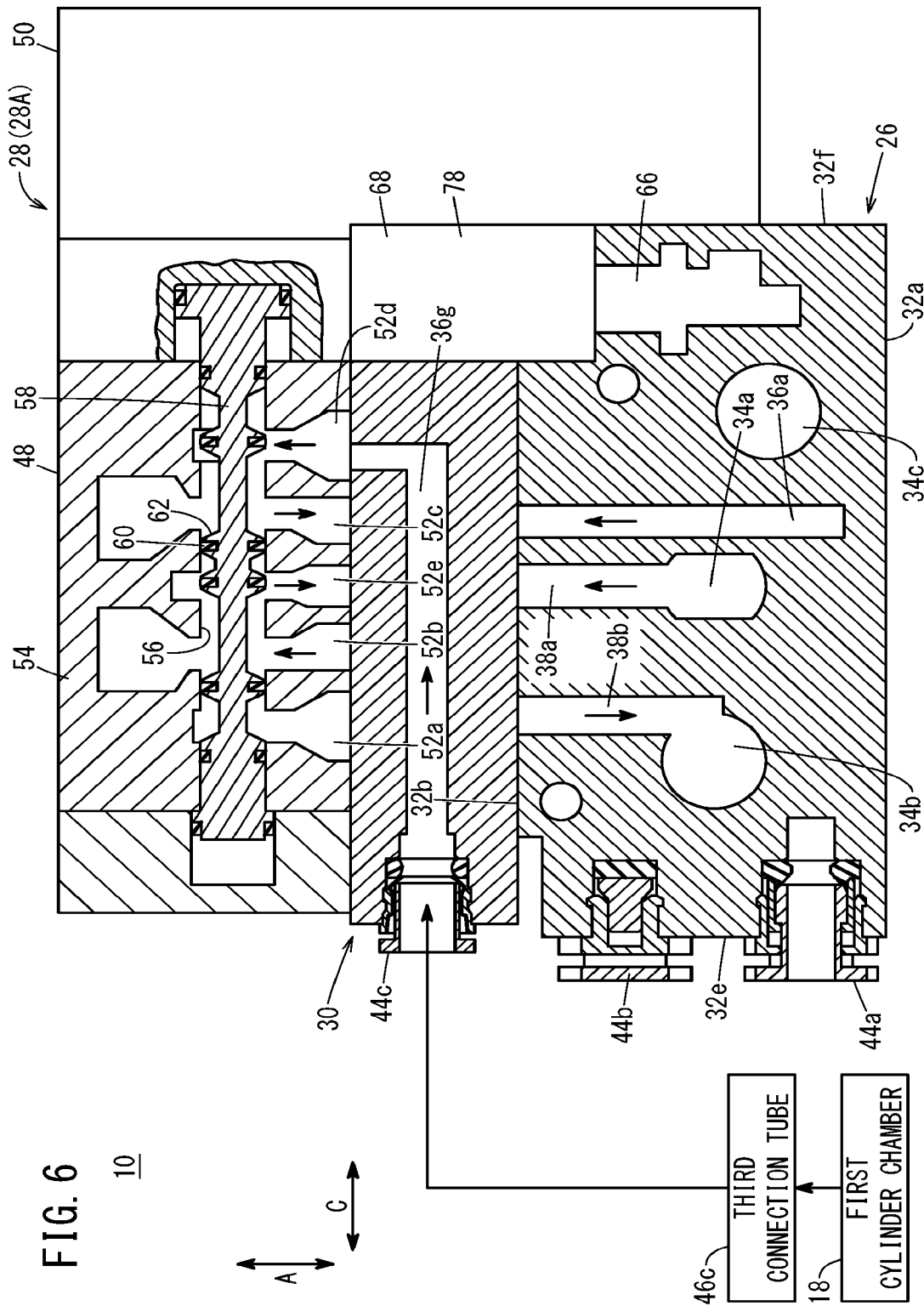
FIG. 6 is a sectional view taken along line VI-VI of FIG. 3.
Figure 7:
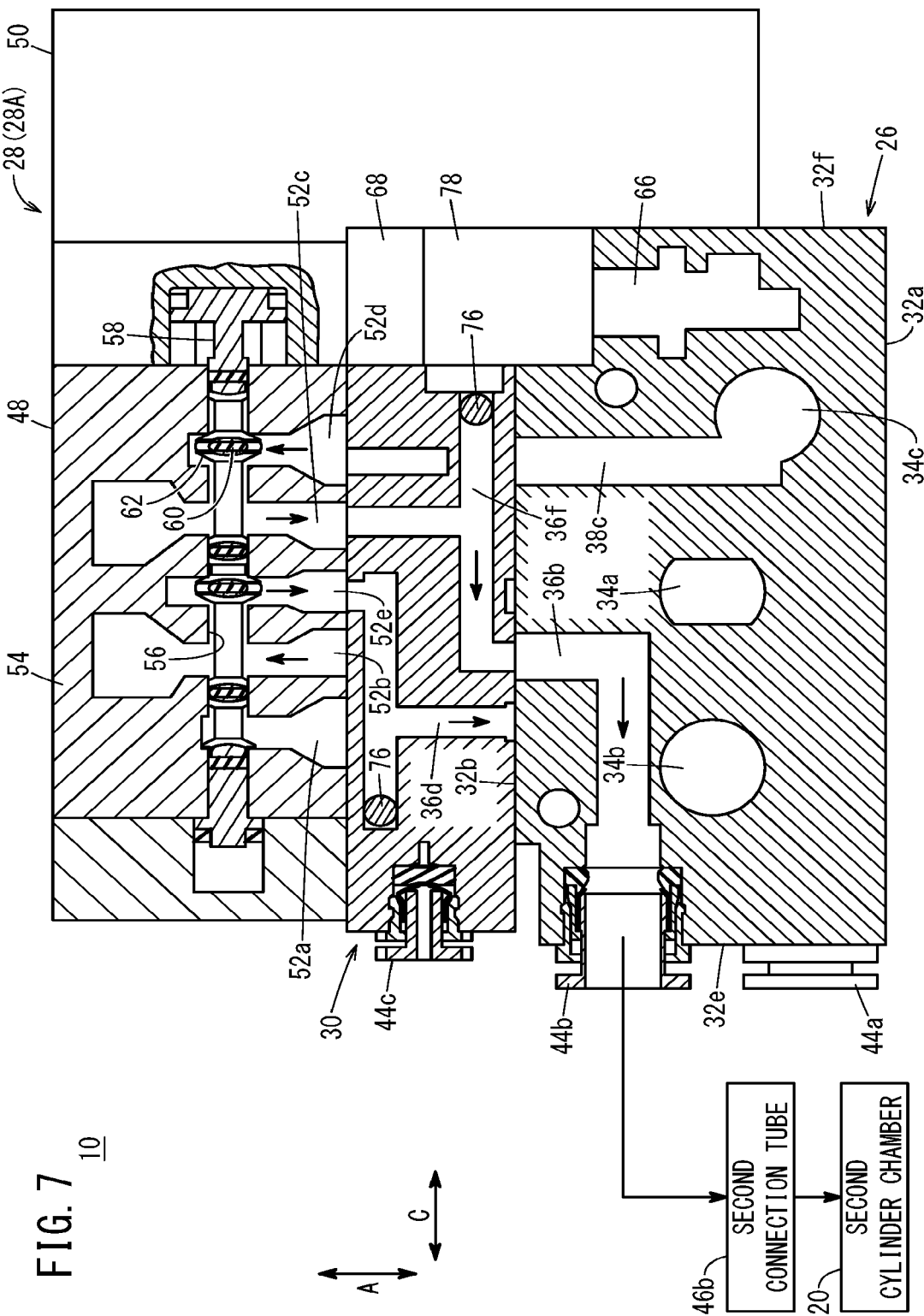
FIG. 7 is a sectional view taken along line VII-VII of FIG. 3.

On the other hand, when performing the return process of pulling in the piston rod 22, the switching valve 28A is switched from the first position to the second position as shown in FIG. 1. As a result, the supply of fluid from the fluid supply source 24 to the first cylinder chamber 18 is stopped. Then, as shown in FIGS. 1, 5, and 6, the fluid in the first cylinder chamber 18 flows into the first connection port 36a of the manifold 26 via the first connection tube 46a (throttle valve 70), and flows into the seventh connection port 36g of the flow path unit 30 via the third connection tube 46c (second check valve 74).

Here, the fluid that has flowed into the first connection port 36a is discharged to the outside, through the fifth connection port 36e, the second port 52b, the fifth port 52e, the fourth connection port 36d, the discharge hole 38b, the discharge port 34b, and the silencer 40. On the other hand, the fluid that has flowed into the seventh connection port 36g flows into the second cylinder chamber 20, through the fourth port 52d, the third port 52c, the sixth connection port 36f, the second connection port 36b and the second connection tube 46b. When the fluid flows into the second cylinder chamber 20, the piston 16 is displaced to the side opposite to the piston rod 22, and the piston rod 22 is pulled in.

As described above, in the returning process, the piston 16 is displaced using the fluid discharged from the inside of the first cylinder chamber 18. Therefore, it is not necessary to supply the fluid from the fluid supply source 24 into the second cylinder chamber 20, and thus the electric power consumption and air consumption of the fluid supply source 24 can be suppressed. As a result, energy saving of the cylinder drive device 10 can be achieved.

[3. Modified Example of the Present Embodiment]

Figure 12:
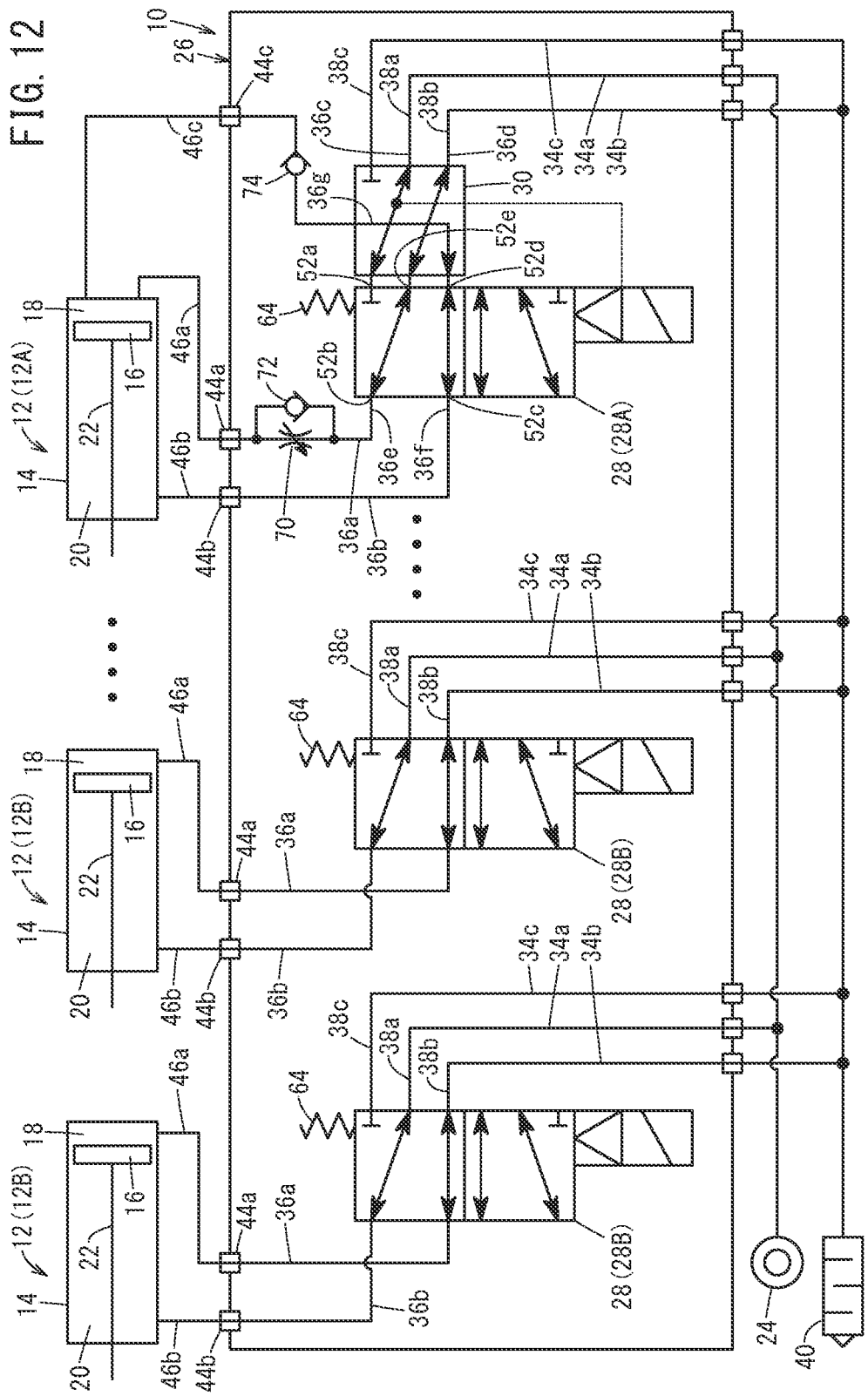
FIG. 12 is a schematic configuration diagram of a modified example of the cylinder drive device of FIG. 1.

FIG. 12 illustrates a modified example of the cylinder drive device 10 according to the present embodiment. In this modified example, the throttle valve 70, the first check valve 72, and the second check valve 74 are provided on the manifold 26 side or the flow path unit 30 side. In this case, the throttle valve 70, the first check valve 72, and the second check valve 74 may be built in the manifold 26 or the flow path unit 30, or may be arranged near the manifold 26 or the flow path unit 30.

[4. Advantageous Effects of the Present Embodiments]

As described above, the cylinder drive device 10 according to the present embodiment includes the manifold 26 having a block shape and in which a plurality of holes are formed, fluid flowing through the holes and being used to drive the plurality of fluid pressure cylinders 12 (12A, 12B), and the plurality of switching valves 28 (28A, 28B) configured to be mounted to the manifold 26, each of the switching valves 28 configured to alternately supply fluid to the first cylinder chamber 18 and the second cylinder chamber 20 of each of the plurality of fluid pressure cylinders 12, the first cylinder chamber 18 and the second cylinder chamber 20 being separated by the piston 16 of each of the fluid pressure cylinders 12. Further, the flow path unit 30 according to the present embodiment is used for the cylinder drive device 10.

In this case, the second check valve 74 (the check valve) is provided between at least one (12A) of the plurality of fluid pressure cylinders 12 and one (28A) of the switching valves 28 that supplies fluid to the one (12A) of the fluid pressure cylinders 12, the second check valve 74 prevents fluid from flowing in a direction from the one switching valve 28A to the first cylinder chamber 18 of the one fluid pressure cylinder 12A. The throttle valve 70 is provided between the first cylinder chamber 18 of the one fluid pressure cylinder 12A and the one switching valve 28A.

The flow path unit 30 is interposed between the manifold 26 and the one switching valve 28A, and allows communication between the one switching valve 28A and the second check valve 74 and between the one switching valve 28A and the throttle valve 70, the flow path unit 30 communicating with the plurality of holes in a manner that fluid flows into the one switching valve 28A.

Thus, in the present embodiment, the flow path unit 30 is interposed between the manifold 26 and the at least one switching valve 28A. As a result, when driving the plurality of fluid pressure cylinders 12, it is possible to configure the second check valve 74 and the throttle valve 70 so as to be connected to only the fluid pressure cylinders 12A among the fluid pressure cylinders 12. That is, the cylinder drive device 10 can be configured by mounting the required number of the flow path units 30 to the manifold 26 of the existing equipment that currently in operation. Therefore, the cylinder drive device 10 can be easily constructed according to the user's application.

The plurality of holes of the manifold 26 include the supply port 34a configured to guide fluid from the fluid supply source 24 thereto, the at least one discharge port 34b, 34c configured to discharge fluid to outside, the plurality of first connection ports 36a communicating with the first cylinder chambers 18 of the plurality of fluid pressure cylinders 12 (12A, 12B), and the plurality of second connection ports 36b communicating with the second cylinder chambers 20 of the plurality of fluid pressure cylinders 12 (12A, 12B).

Further, the flow path unit 30 is a block body configured to be mounted to the manifold 26, and a plurality of holes are formed in the flow path unit 30 and fluid flows therethrough. In this case, the plurality of holes of the flow path unit 30 are the third to seventh connection ports 36c to 36g. The third connection port 36c is configured to allow communication between the supply port 34a and the one switching valve 28A. The fourth connection port 36d is configured to allow communication between the discharge port 34b and the one switching valve 28A. The fifth connection port 36e is configured to allow communication between the one switching valve 28A and one of the first connection ports 36a that communicates with the first cylinder chamber 18 of the one fluid pressure cylinder 12A via the throttle valve 70. The sixth connection port 36f is configured to allow communication between the one switching valve 28A and one of the second connection ports 36b that communicates with the second cylinder chamber 20 of the one fluid pressure cylinder 12A. The seventh connection port 36g is configured to allow communication between the second check valve 74 and the one switching valve 28A.

The one switching valve 28A is configured to switch each state into a communication state or a blocking state between the third connection port 36c and the fifth connection port 36e, between the fourth connection port 36d and the fifth connection port 36e, the fourth connection port 36d and the sixth connection port 36f, and the sixth connection port 36f and the seventh connection port 36g.

That is, at a first position of the one switching valve 28A, the third connection port 36c and the fifth connection port 36e communicate with each other, the fourth connection port 36d and the sixth connection port 36f communicate with each other, and communication between the fourth connection port 36d and the fifth connection port 36e is blocked, and communication between the sixth connection port 36f and the seventh connection port 36g is blocked.

On the other hand, at a second position of the one switching valve 28A, the fourth connection port 36d and the fifth connection port 36e communicate with each other, the sixth connection port 36f and the seventh connection port 36g communicate with each other, and communication between the third connection port 36c and the fifth connection port 36e is blocked, and communication between the fourth connection port 36d and the sixth connection port 36f is blocked.

As a result, only by mounting the switching valve 28A to the manifold 26 of the existing equipment via the flow path unit 30, the second check valve 74 and the throttle valve 70 are connected to only the fluid pressure cylinder 12A to be driven by the switching valve 28A. As a result, the cylinder drive device 10 can be constructed easily and efficiently.

Further, the second check valve 74 and the throttle valve 70 are provided on a first cylinder chamber 18 side of the one fluid pressure cylinder 12A, or a manifold 26 side or a flow path unit 30 side. In any case, the cylinder drive device 10 can be easily constructed, in which the normal switching valve(s) 28B directly mounted to the manifold 26 and the switching valve(s) 28A mounted to the manifold 26 via the flow path unit 30 coexist. Also, the cylinder drive device 10 can control all the switching valves 28 (28A, 28B).

The plurality of switching valves 28 (28A, 28B) are each a solenoid valve including the connector (68). In this case, the manifold 26 is provided with an energizing portion 66 configured to energize the plurality of switching valves 28 (28A, 28B) via the plurality of connectors 68. The flow path unit 30 is provided with the connecting portion 78 configured to connect the connector 68 of the one switching valve 28A and the energizing portion 66 when the one switching valve 28A is mounted to the manifold 26 via the flow path unit 30. As a result, the switching valve 28A mounted to the manifold 26 via the flow path unit 30 can be easily controlled from the outside.

It should be noted that the present invention is not limited to the above-described embodiments, and it goes without saying that various configurations can be adopted based on the content of this specification.

The invention claimed is:

1. A cylinder drive device comprising:
   a manifold having a block shape and in which a plurality of holes are formed, fluid flowing through the holes and being used to drive a plurality of fluid pressure cylinders; and
   a plurality of switching valves configured to be mounted to the manifold, each of the switching valves configured to alternately supply fluid to a first cylinder chamber and a second cylinder chamber of each of the plurality of fluid pressure cylinders, the first cylinder chamber and the second cylinder chamber being separated by a piston of each of the fluid pressure cylinders, wherein
   a first flow path and a second flow path are provided between at least one of the plurality of fluid pressure cylinders and one of the switching valves that supplies fluid to the at least one of the fluid pressure cylinders, the first flow path is configured to allow the fluid to flow to and from the first cylinder chamber of the at least one of the fluid pressure cylinders and the one of the switching valves, the second flow path is configured to allow fluid to flow from the first cylinder chamber of the at least one of the fluid pressure cylinders to the second cylinder under chamber via the one of the switching valves,
   the first flow path is provided with a first check valve preventing fluid from flowing in a direction from the first cylinder chamber of the at least one fluid pressure cylinder to the one switching valve, and a throttle valve in parallel with the first check valve,
   the second flow path is provided with a second check valve preventing fluid from flowing in a direction from the one switching valve to the first cylinder chamber of the at least one fluid pressure cylinder,
   the cylinder drive device further comprises a flow path unit interposed between the manifold and the one switching valve and including a plurality of flow paths, the plurality of flow paths allowing communication between the manifold and the first check valve, between the one switching valve and the second check valve and between the manifold and the throttle valve, the flow path unit communicating with the plurality of holes of the manifold in a manner that fluid flows into the one switching valve.

2. The cylinder drive device according to claim 1, wherein the plurality of holes of the manifold include a supply port configured to guide fluid from a fluid supply source thereto, at least one discharge port configured to discharge fluid to an outside of the manifold, a plurality of first connection ports communicating with the first cylinder chambers of the plurality of fluid pressure cylinders, and a plurality of second connection ports communicating with the second cylinder chambers of the plurality of fluid pressure cylinders,
   the plurality of flow paths of the flow path unit include a third connection port configured to allow communication between the supply port and the one switching valve, a fourth connection port configured to allow communication between the at least one discharge port and the one switching valve, a fifth connection port configured to allow communication between the one switching valve and one of the first connection ports that communicates with the first cylinder chamber of the at least one fluid pressure cylinder via the throttle valve, a sixth connection port configured to allow communication between the one switching valve and one of the second connection ports that communicates with the second cylinder chamber of the at least one fluid pressure cylinder, and a seventh connection port configured to allow communication between the check valve and the one switching valve,
   the one switching valve is configured to switch into a communication state or a blocking state between the third connection port and the fifth connection port, between the fourth connection port and the fifth connection port, between the fourth connection port and the sixth connection port, and between the sixth connection port and the seventh connection port,
   at a first position of the one switching valve, the third connection port and the fifth connection port communicate with each other, the fourth connection port and the sixth connection port communicate with each other, and communication between the fourth connection port and the fifth connection port is blocked, and communication between the sixth connection port and the seventh connection port is blocked,
   at a second position of the one switching valve, the fourth connection port and the fifth connection port communicate with each other, the sixth connection port and the seventh connection port communicate with each other, and communication between the third connection port and the fifth connection port is blocked, and communication between the fourth connection port and the sixth connection port is blocked.

3. The cylinder drive device according to claim 1, wherein the check valve and the throttle valve are provided on a first cylinder chamber side of the at least one fluid pressure cylinder, or a manifold side or a flow path unit side.

4. The cylinder drive device according to claim 1, wherein the plurality of switching valves are each a solenoid valve including a connector,
   the manifold is provided with an energizing portion configured to energize the plurality of switching valves via a plurality of the connectors, the flow path unit is provided with a connecting portion configured to connect the connector of the one switching valve and the energizing portion when the one switching valve is mounted to the manifold via the flow path unit.

5. A flow path unit used for a cylinder drive device, the cylinder drive device comprising:
- a manifold having a block shape and in which a plurality of holes are formed, fluid flowing through the holes and being used to drive a plurality of fluid pressure cylinders; and,
- a plurality of switching valves configured to be mounted to the manifold, each of the switching valves configured to alternately supply fluid to a first cylinder chamber and a second cylinder chamber of each of the plurality of fluid pressure cylinders, the first cylinder chamber and the second cylinder chamber being separated by a piston of each of the fluid pressure cylinders, wherein a first flow path and a second flow path are provided between at least one of the plurality of fluid pressure cylinders and one of the switching valves that supplies fluid to the at least one of the fluid pressure cylinders, the first flow path is configured to allow the fluid to flow to and from the first cylinder chamber of the at least one of the fluid pressure cylinders and the one of the switching valves, the second flow path is configured to allow fluid to flow from the first cylinder chamber of the at least one of the fluid pressure cylinders to the second cylinder chamber via the one of the switching valves, the first flow path is provided with a first check valve preventing fluid from flowing in a direction from the first cylinder chamber of the at least one fluid pressure cylinder to the one switching valve, and a throttle valve in parallel with the first cheek valve, the second flow path is provided with a second check valve preventing fluid front flowing in a direction from the one switching valve to the first cylinder chamber of the at least one fluid pressure cylinder, the flow path unit is interposed between the manifold and the one switching valve and includes a plurality of flow paths, the plurality of flow paths allow communication between the manifold and the first check valve, between the one switching valve and the second check valve and between the manifold and the throttle valve, the flow path unit communicating with the plurality of holes of the manifold in a manner that fluid flows into the one switching valve.

* * * * *